US007827600B2

(12) United States Patent
Okimura et al.

(10) Patent No.: US 7,827,600 B2
(45) Date of Patent: Nov. 2, 2010

(54) ELECTRONIC EQUIPMENT AND IMAGE FORMING APPARATUS

(75) Inventors: Naomasa Okimura, Saitama (JP); Takenori Obara, Saitama (JP)

(73) Assignee: Fuji Xerox Co., Ltd., Tokyo (JP)

(*) Notice: Subject to any disclaimer, the term of this patent is extended or adjusted under 35 U.S.C. 154(b) by 494 days.

(21) Appl. No.: 11/776,992

(22) Filed: Jul. 12, 2007

(65) Prior Publication Data

US 2008/0163349 A1 Jul. 3, 2008

(30) Foreign Application Priority Data

Dec. 28, 2006 (JP) ............................ 2006-355097

(51) Int. Cl.

| | |
|---|---|
| ***G06F 7/04*** | (2006.01) |
| *G06F 15/16* | (2006.01) |
| *G06F 17/30* | (2006.01) |
| *H04L 29/06* | (2006.01) |

(52) U.S. Cl. ............................................ 726/9; 726/20

(58) Field of Classification Search ..................... 726/9, 726/20

See application file for complete search history.

(56) References Cited

U.S. PATENT DOCUMENTS

| | | | | |
|---|---|---|---|---|
| 4,907,111 | A * | 3/1990 | Derman | 360/97.02 |
| 5,136,862 | A * | 8/1992 | Langen | 70/14 |
| D329,046 | S * | 9/1992 | Westland | D8/339 |
| 5,220,815 | A * | 6/1993 | Davidge et al. | 70/14 |
| 5,305,621 | A * | 4/1994 | Broadwater | 70/14 |
| 5,377,269 | A * | 12/1994 | Heptig et al. | 726/20 |
| 5,377,512 | A * | 1/1995 | Kelley | 70/58 |
| 5,615,246 | A * | 3/1997 | Beveridge | 379/56.2 |
| 5,687,379 | A * | 11/1997 | Smith et al. | 710/200 |
| 5,724,027 | A * | 3/1998 | Shipman et al. | 726/16 |
| 5,836,010 | A * | 11/1998 | Kim | 726/20 |
| 5,859,968 | A * | 1/1999 | Brown et al. | 726/36 |
| 5,884,026 | A * | 3/1999 | Kong | 726/19 |
| 5,960,084 | A * | 9/1999 | Angelo | 713/185 |
| 6,032,256 | A * | 2/2000 | Bernard | 726/34 |
| 6,170,304 | B1 * | 1/2001 | Ohta | 70/14 |
| 6,173,405 | B1 * | 1/2001 | Nagel | 726/21 |
| 6,249,863 | B1 * | 6/2001 | Redford et al. | 713/1 |
| 6,362,893 | B1 * | 3/2002 | Francis et al. | 358/1.14 |
| 6,529,590 | B1 * | 3/2003 | Centers | 379/106.01 |
| 6,615,166 | B1 * | 9/2003 | Guheen et al. | 703/27 |
| 6,650,430 | B2 * | 11/2003 | Francis et al. | 358/1.14 |
| 6,651,175 | B1 * | 11/2003 | Slama | 726/30 |
| 6,671,818 | B1 * | 12/2003 | Mikurak | 714/4 |
| 6,760,228 | B1 * | 7/2004 | Chi et al. | 361/737 |
| 6,871,192 | B2 * | 3/2005 | Fontana et al. | 705/51 |

(Continued)

FOREIGN PATENT DOCUMENTS

| | | |
|---|---|---|
| JP | 2001306283 A | 11/2001 |

(Continued)

*Primary Examiner*—David García Cervetti
(74) *Attorney, Agent, or Firm*—Sughrue Mion, PLLC

(57) ABSTRACT

An electronic equipment includes: a first connecting unit that connects an external apparatus and a transmit and receive unit; a prohibit unit; an identification information storage; a second connecting unit that is connected to a key constituting member including memory unit storing therein authentication information corresponding to the identification information; a covering unit; a gain unit; a judge unit; and a permit unit.

12 Claims, 13 Drawing Sheets

U.S. PATENT DOCUMENTS

| | | | | |
|---|---|---|---|---|
| 6,912,663 | B1 * | 6/2005 | Dayan et al. | 726/16 |
| 6,991,479 | B2 * | 1/2006 | Miao | 439/133 |
| 7,050,892 | B1 * | 5/2006 | Liebl et al. | 701/29 |
| 7,117,352 | B1 * | 10/2006 | Giles et al. | 713/2 |
| 7,174,754 | B2 * | 2/2007 | Gahlhoff et al. | 70/168 |
| 7,179,170 | B2 * | 2/2007 | Martinek et al. | 463/29 |
| 7,315,826 | B1 * | 1/2008 | Guheen et al. | 705/7 |
| 7,356,588 | B2 * | 4/2008 | Stineman et al. | 709/224 |
| 7,443,661 | B2 * | 10/2008 | Xu et al. | 361/679.55 |
| 7,483,860 | B2 * | 1/2009 | Cronce et al. | 705/50 |
| 7,495,900 | B2 * | 2/2009 | Shi et al. | 361/679.02 |
| 7,526,555 | B2 * | 4/2009 | Shahindoust | 709/227 |
| 2002/0078366 | A1 * | 6/2002 | Raice | 713/200 |
| 2002/0095588 | A1 * | 7/2002 | Shigematsu et al. | 713/186 |
| 2003/0097589 | A1 * | 5/2003 | Syvanne | 713/201 |
| 2003/0097590 | A1 * | 5/2003 | Syvanne | 713/201 |
| 2003/0120605 | A1 * | 6/2003 | Fontana et al. | 705/59 |
| 2003/0130032 | A1 * | 7/2003 | Martinek et al. | 463/29 |
| 2003/0172035 | A1 * | 9/2003 | Cronce et al. | 705/59 |
| 2003/0224637 | A1 * | 12/2003 | Ling | 439/133 |
| 2004/0015709 | A1 * | 1/2004 | Chen et al. | 713/193 |
| 2004/0107358 | A1 * | 6/2004 | Shiakallis | 713/200 |
| 2005/0013111 | A1 * | 1/2005 | Boga et al. | 361/686 |
| 2005/0132240 | A1 * | 6/2005 | Stineman et al. | 713/300 |
| 2005/0202698 | A1 * | 9/2005 | Miao | 439/133 |
| 2005/0210736 | A1 * | 9/2005 | Gahlhoff et al. | 43/124 |
| 2005/0213295 | A1 * | 9/2005 | Perez et al. | 361/683 |
| 2005/0262361 | A1 * | 11/2005 | Thibadeau | 713/193 |
| 2005/0286212 | A1 * | 12/2005 | Brignone et al. | 361/679 |
| 2006/0002079 | A1 * | 1/2006 | Xu et al. | 361/686 |
| 2006/0107073 | A1 * | 5/2006 | Lane et al. | 713/194 |
| 2006/0123860 | A1 * | 6/2006 | Gahlhoff et al. | 70/168 |
| 2006/0141830 | A1 * | 6/2006 | Diaz et al. | 439/101 |
| 2006/0206720 | A1 * | 9/2006 | Harada et al. | 713/182 |
| 2006/0224791 | A1 * | 10/2006 | Keppeler | 710/62 |
| 2006/0266746 | A1 * | 11/2006 | Wang | 220/3.2 |
| 2006/0279918 | A1 * | 12/2006 | Shi et al. | 361/683 |
| 2007/0013689 | A1 * | 1/2007 | Choi | 345/211 |
| 2007/0016965 | A1 * | 1/2007 | Dan et al. | 726/34 |
| 2007/0114054 | A1 * | 5/2007 | Le Mon | 174/61 |
| 2007/0146134 | A1 * | 6/2007 | Belden et al. | 340/571 |
| 2007/0162655 | A1 * | 7/2007 | Huang | 710/36 |
| 2008/0151485 | A1 * | 6/2008 | Thornton et al. | 361/684 |

FOREIGN PATENT DOCUMENTS

| | | | |
|---|---|---|---|
| JP | 2003 288323 | A | 10/2003 |
| JP | 2005079629 | A | 3/2005 |
| JP | 2006 246406 | A | 9/2006 |

* cited by examiner

ELECTRONIC EQUIPMENT AND IMAGE FORMING APPARATUS

CROSS-REFERENCE TO RELATED APPLICATIONS

This application is based on and claims priority under 35 U.S.C. 119 from Japanese Patent Application No. 2006-355097 filed Dec. 28, 2006.

BACKGROUND

1. Technical Field

The present invention relates to electronic equipment and an image forming apparatus.

2. Related Art

Conventionally, as regards a printer used as an image forming apparatus which is a type of electronic equipment, in most cases, it is connected one to one to an external apparatus such as a personal computer and a host computer through a parallel port I/F (interface) and receives print information through the interface to print such print information.

When a large number of terminals such as personal computers are connected to a local area network (a network such as LAN) for data communication, an NIC (a network interface card which is also referred to as a LAN card or a LAN board) used as an interface for network communication is built in a printer; to the port (connecting port) of a network adapter connector (for example, a standard RJ-45 connector which is an 8-pin standard modular connector used in 10BASE-T, 100BASE-TX and the like) provided in such NIC, there is connected the connector of a network cable (for example, the above-mentioned RJ-45 connector); and, data such as print information can be transmitted and received between the printer and personal computers through the present network cable.

SUMMARY

According to an aspect of the present invention, an electronic equipment comprising: a first connecting unit that connects an external apparatus and a transmit and receive unit, which transmits and receives information; a prohibit unit that prohibits use of a function to transmit and receive the information; an identification information storage that stores therein identification information to permit use of the function prohibited by the prohibit unit; a second connecting unit that is connected to a key constituting member including memory unit storing therein authentication information corresponding to the identification information; a covering unit that, in a case where the key constituting member is not connected to the second connecting unit, covers at least part of the first connecting unit and that, in a case where the key constituting member is connected to the second connecting unit, removes the covering of the first connecting unit; a gain unit that, in a case where the key constituting member is connected to the second connecting unit, gains the authentication information from the memory unit; a judge unit that judges whether or not the authentication information gained by the gain unit corresponds to the identification information stored in the identification information storage; and a permit unit that, in a case where it is judged by the judge unit that the authentication information corresponds to the identification information, permits use of the information to transmit and receive function prohibited by the prohibit unit.

BRIEF DESCRIPTION OF THE DRAWINGS

Exemplary embodiment of the present invention will be described in detail based on the following figures, wherein.

DETAILED DESCRIPTION

Figure 1:
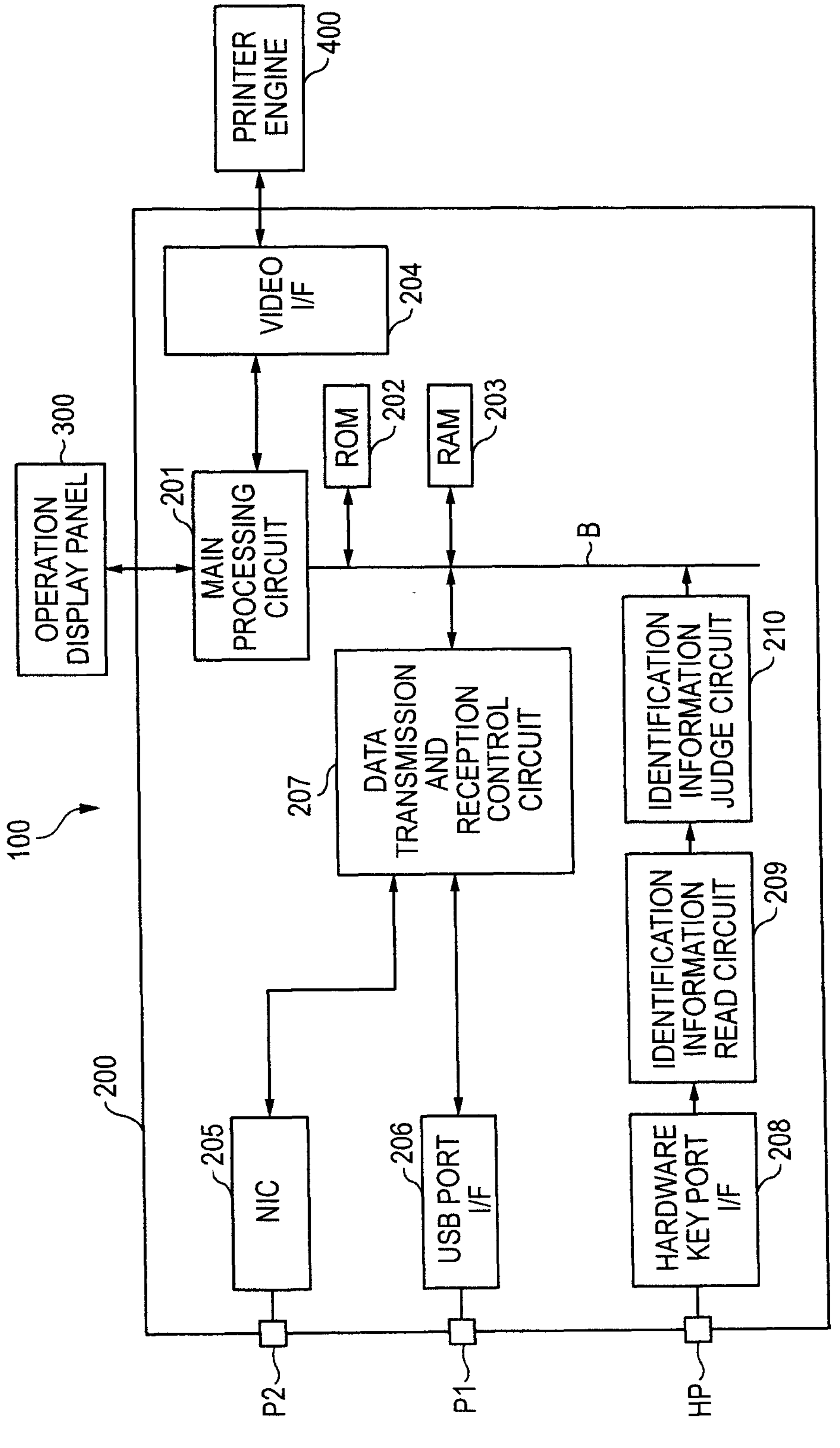
FIG. 1 is a block diagram of the structure of a printer used as an image forming apparatus according to the mode for carrying out the invention.

Now, description will be given below in more detail of the best mode for carrying out the invention with reference to the accompanying drawings. Here, the same parts in the accompanying drawings are given the same reference numerals and thus the duplicate description thereof is omitted. By the way, the following description is given of the best mode for carrying out the invention and thus the present invention is not limited to the present best mode.

Figure 2A:
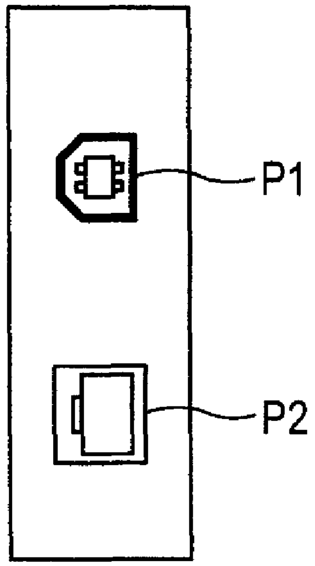
FIG. 2 is an explanatory view of the structure of a port formed in the printer according to the present mode.
Figure 2B:
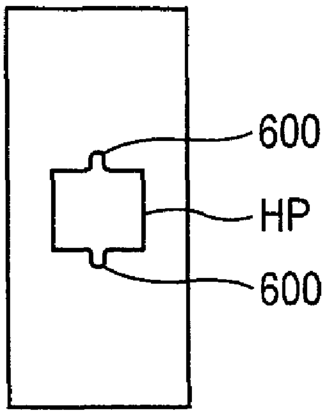
Figure 3:
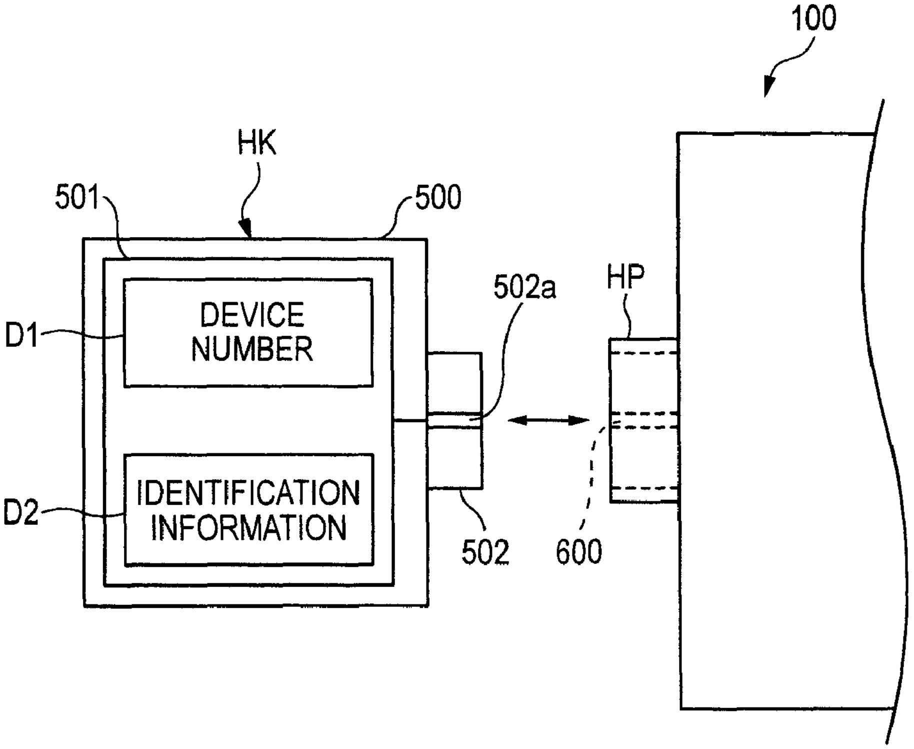
FIG. 3 is an explanatory view of the structure of a hardware key.
Figure 4:
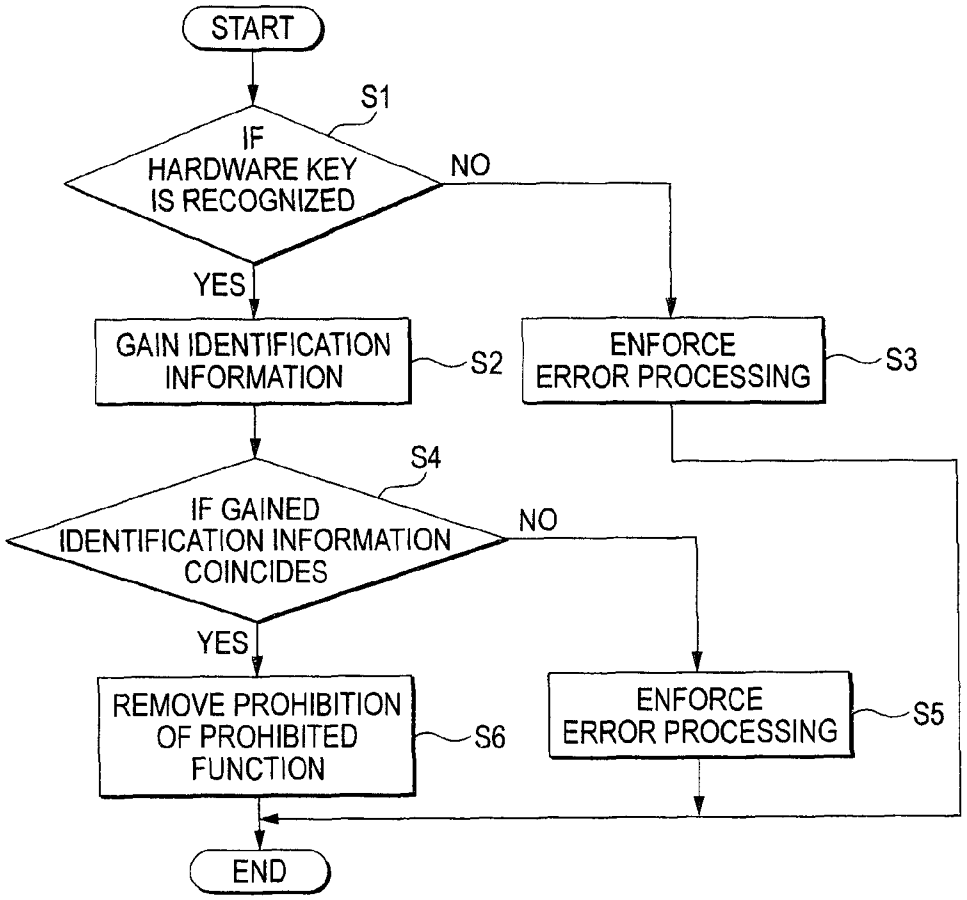
FIG. 4 is a flow chart of a procedure for enforcing a hardware authentication processing.
Figure 5A:
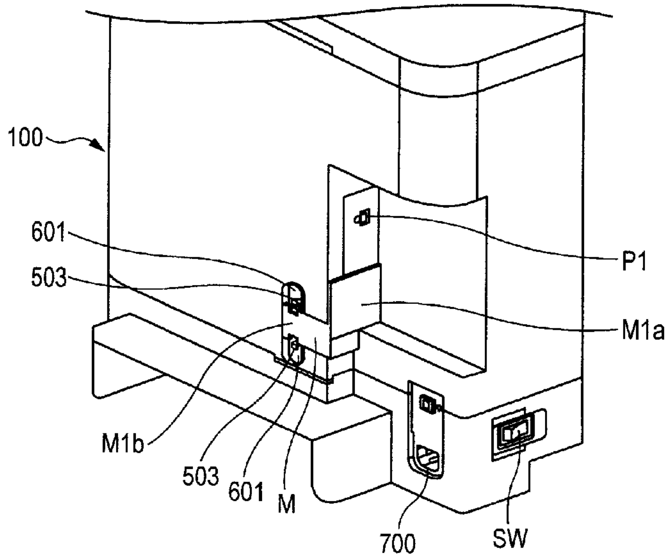
FIGS. 5A and 5B are perspective views of a first embodiment of a structure for covering a LAN port and removing the covered state thereof.
Figure 5B:
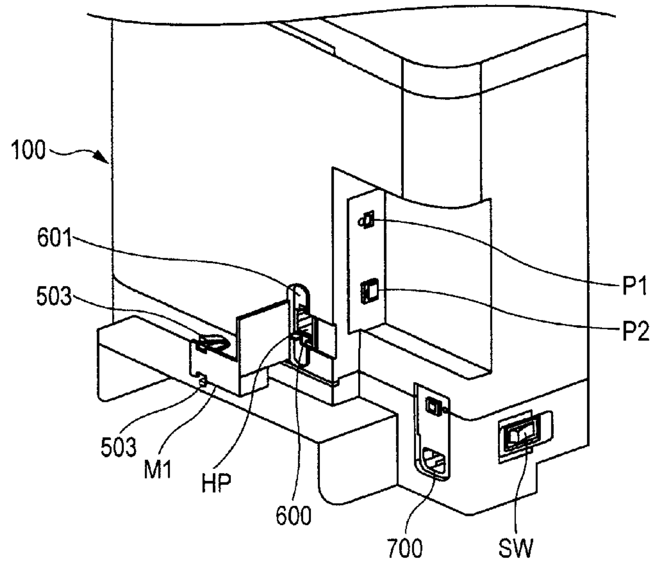
Figure 5C:
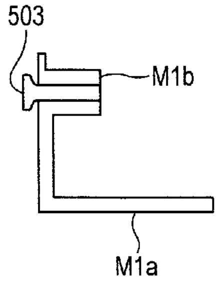
FIG. 5C is an end face view of covering means.
Figure 5D:
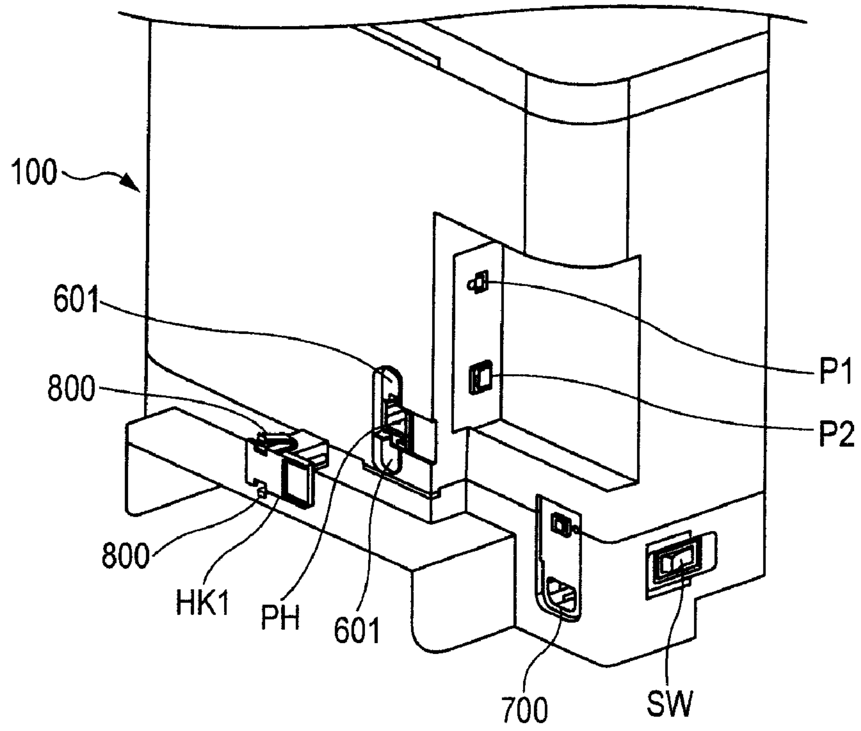
FIGS. 5D and 5E are perspective views of the first embodiment of the structure for covering the LAN port and removing the covered state thereof.
Figure 5E:
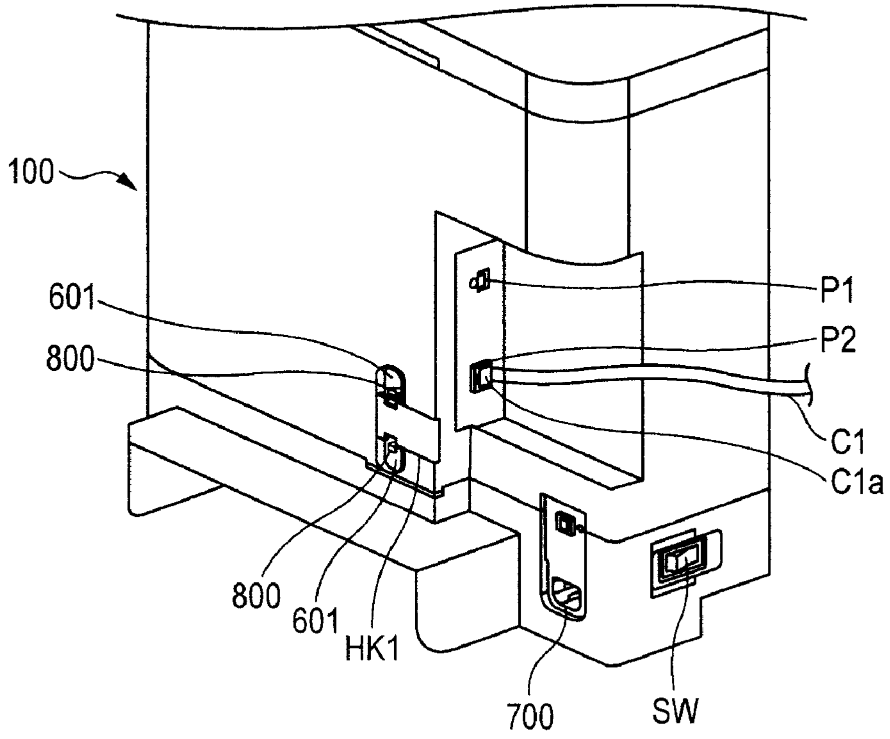
Figure 7:
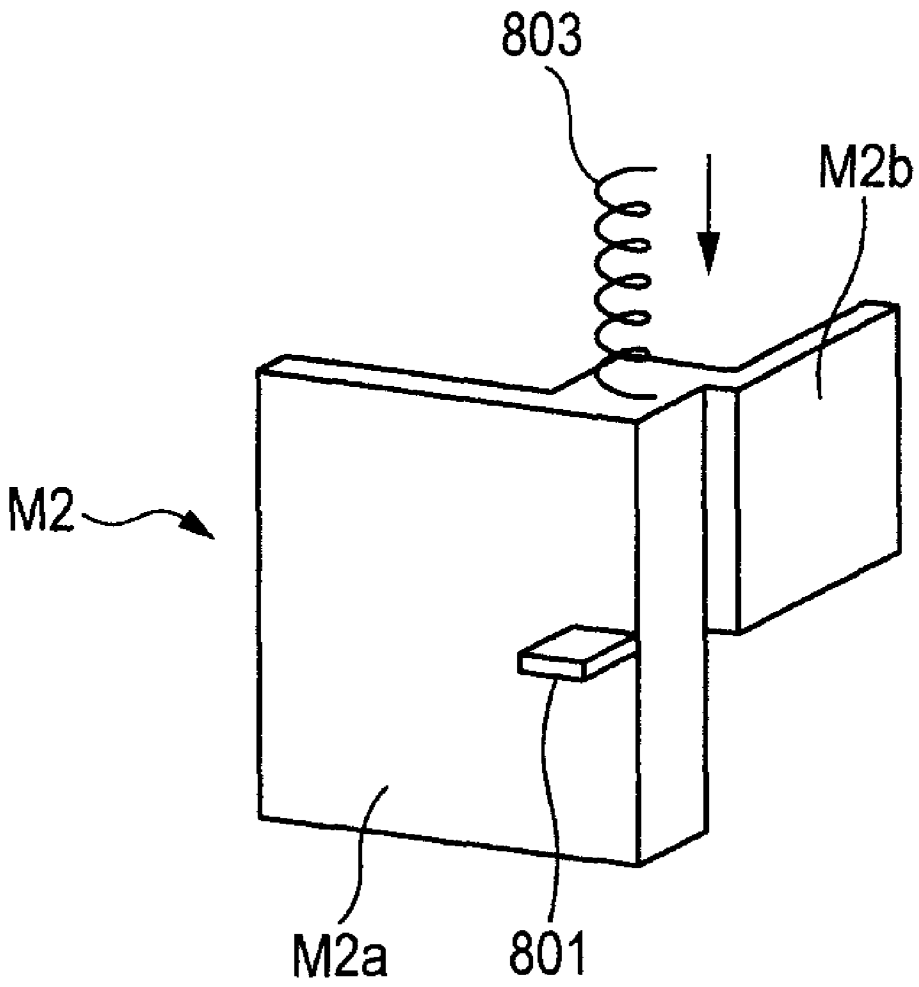
FIG. 7 is a schematic perspective view of the structure of the covering means.
Figure 8A:
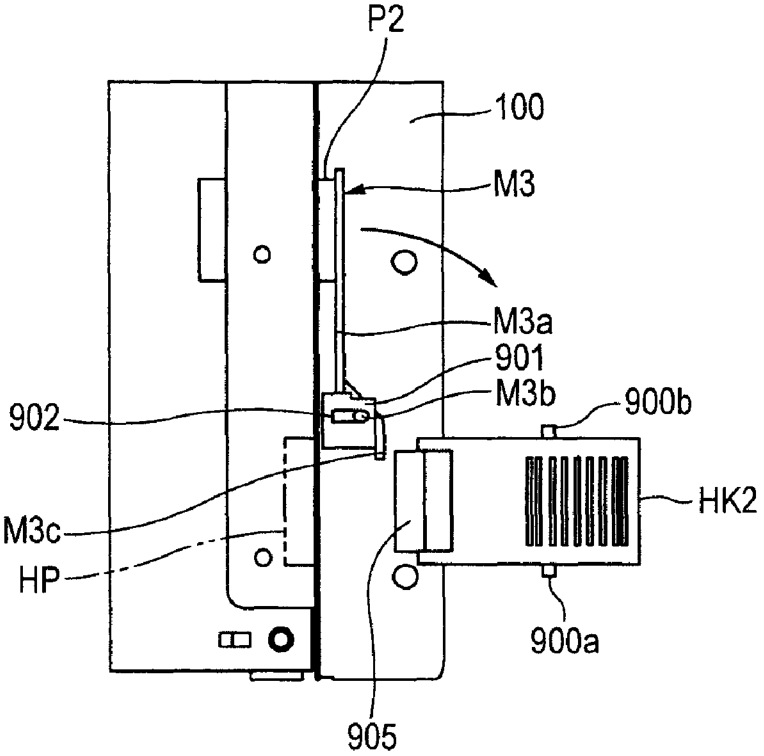
FIGS. 8A and 8B are perspective views of a third embodiment of the structure for covering the LAN port and removing the covered state thereof.
Figure 8B:
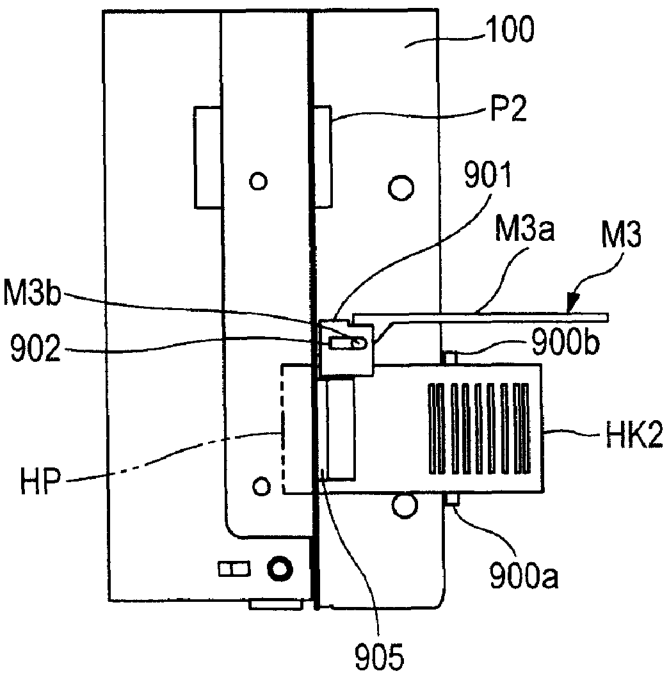
Figure 9:
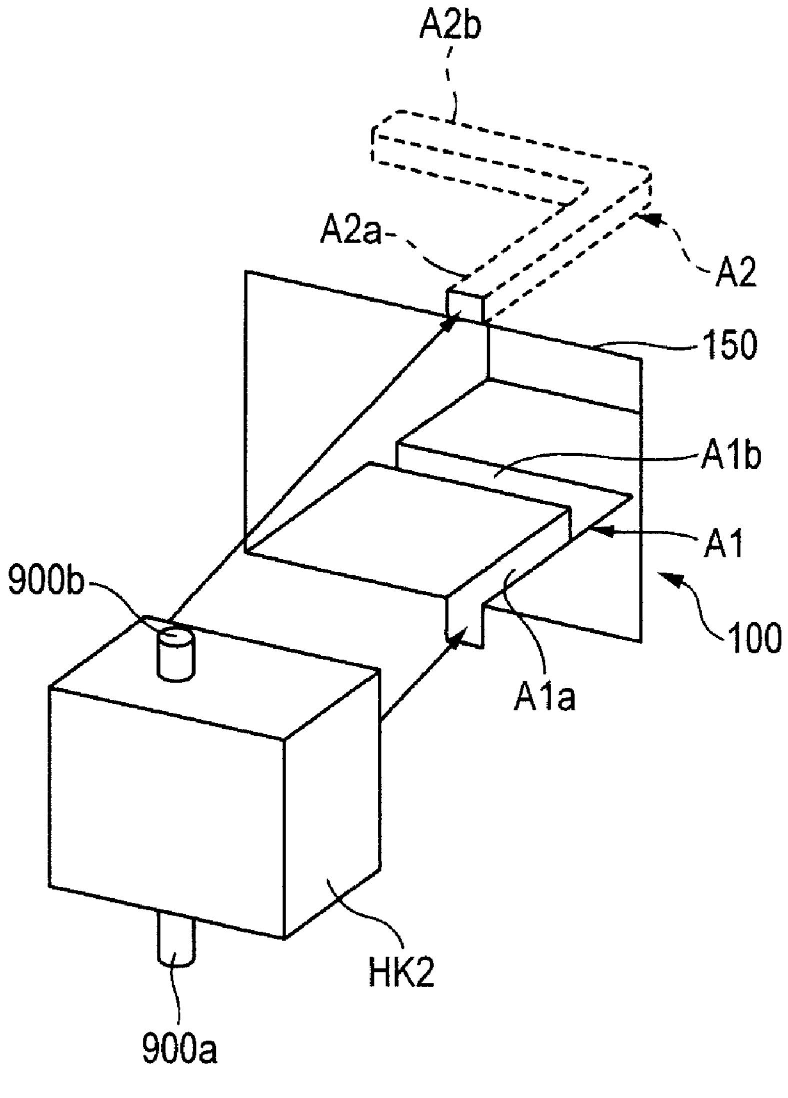
FIG. 9 is a schematic perspective view of a hardware key guide structure employed in the third embodiment.
Figure 11:
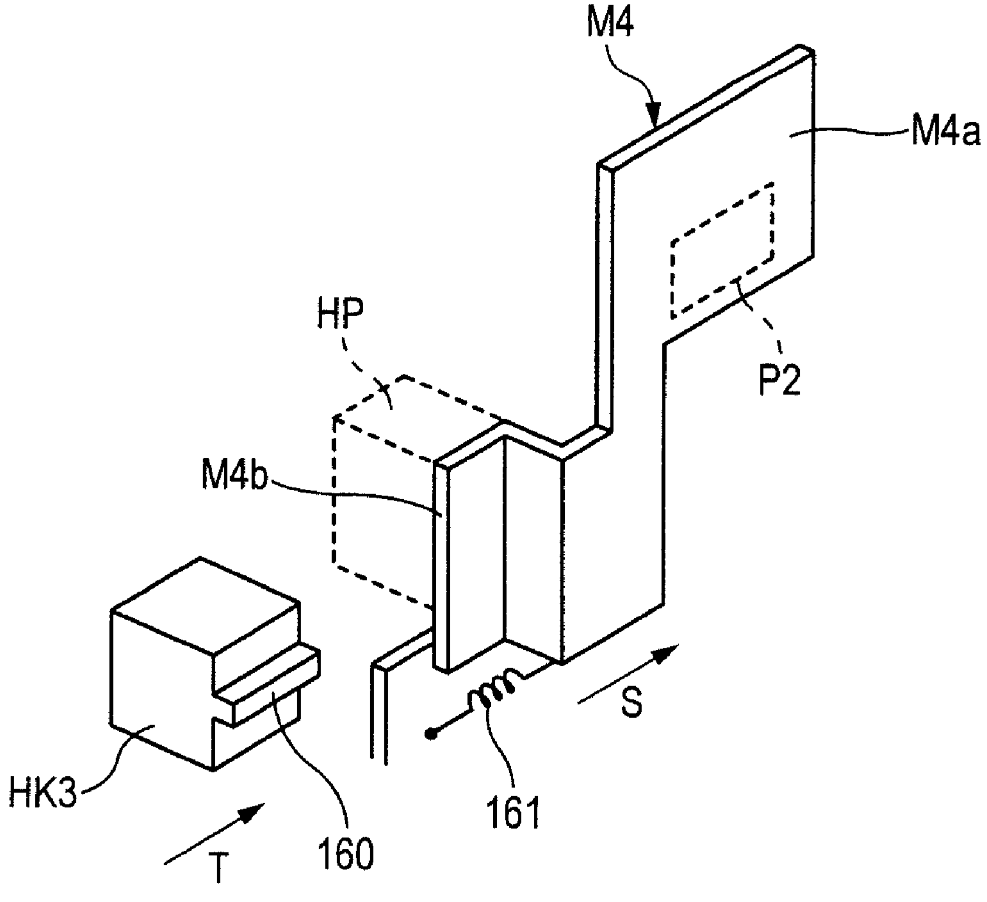
FIG. 11 is a perspective view of a fourth embodiment of the structure for covering a LAN port and removing the covered thereof.
Figure 12:
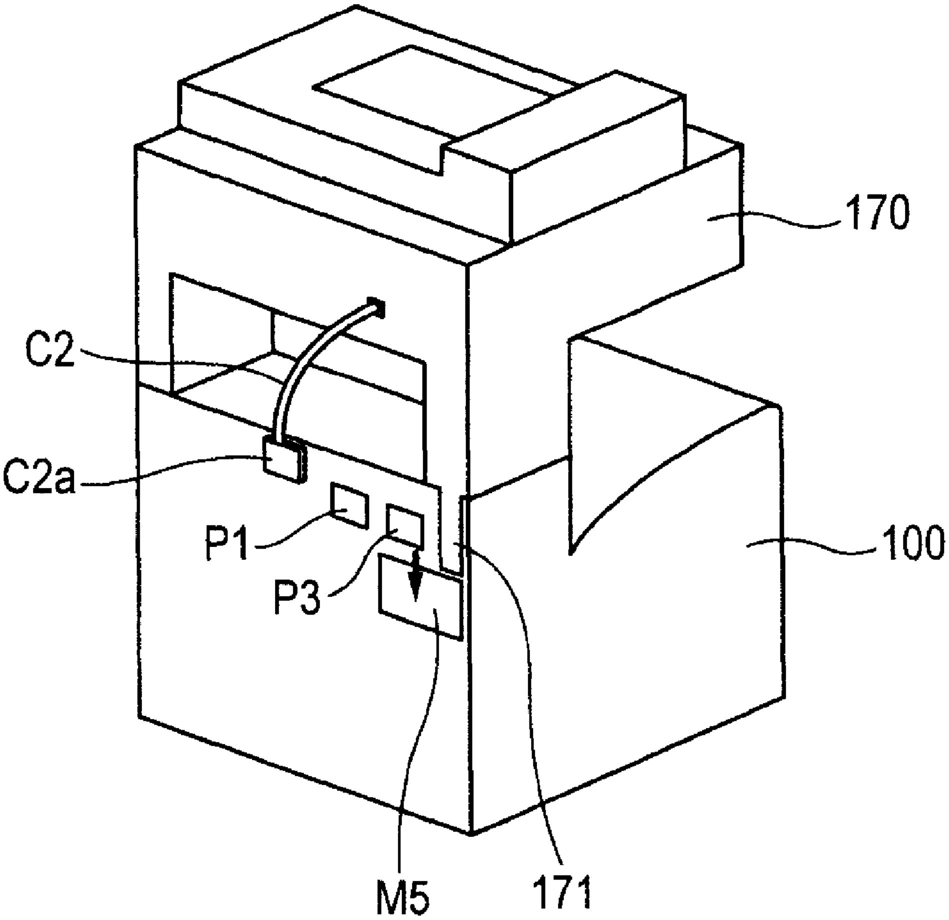
FIG. 12 is a perspective view of a fifth embodiment of a structure for covering a connecting port and removing the covered thereof.

FIG. 1 is a block diagram of the structure of electronic equipment according to the best mode of the invention, specifically, a printer used as an image forming apparatus. FIG. 2 is an explanatory view of the structure of a port formed in the printer according to the best mode of the invention. FIG. 3 is an explanatory view of the structure of a hardware key. FIG. 4 is a flow chart of a processing procedure for enforcing an authentication processing on the hardware key. FIGS. 5A and 5B are respectively perspective views of a first embodiment of a structure for covering a LAN port and removing such covering, FIG. 5C is an end face view of a covering means used in the first embodiment and FIGS. 5D and 5E are respectively perspective views of the first embodiment of the structure for covering the LAN port and removing such covering. FIGS. 6A to 6D are respectively perspective views of a second embodiment of a structure for covering a LAN port and removing such covering. FIG. 7 is a schematic perspective view of the structure of covering means used in the second embodiment. FIGS. 8A and 8B are schematic structure views of a third embodiment of a structure for covering a LAN port and removing such covering. FIG. 9 is a schematic perspective view of a guide structure for a hardware key employed in the third embodiment. FIGS. 10A to 10D are respectively perspective views of the third embodiment of the structure for covering the LAN port and removing such covering. FIG. 11 is a perspective view of a fourth embodiment of a structure for covering a LAN port and removing such covering. FIG. 12 is a perspective view of a fifth embodiment of a structure for covering a LAN port and removing such covering.

Firstly, description will be given below of the structure of a printer according to the best mode of the invention with reference to FIG. 1.

The printer 100 mainly comprises a control unit (for example, a microcomputer) 200 for controlling various devices, an operation display panel (for example, a liquid crystal display panel of a touch panel type) 300 for displaying the number of prints, the specification of a print tray and the like, and a printer engine 400 for executing printing under the control of the control unit 200.

As the printer engine 400, although not limited to a specific one, there can be used a printer engine for a monochrome laser printer, a printer engine for a color printer, or a printer engine for an inkjet printer.

For example, in the case of the printer engine for a monochrome laser printer, the printer engine 400 means the whole of a mechanism for carrying out actual printing which includes a laser driver, a semiconductor laser, an electrostatic drum and the like.

The control unit 200 includes a main processing circuit (which is composed of, for example, a CPU or a 1-chip microcomputer, and functions also as function prohibit means or function use permit means) 201.

Also, the control unit 200 further includes various components which are respectively connected to the CPU 201 through an internal bus B: that is, a ROM 202 for storing therein various data such as a control program and identification information; a RAM (identification information storage means) 203 used as a work area for the control processing of the CPU 201; a video I/F (interface) 204 for transmitting image data generated by the CPU 201 based on the print information to the printer engine 400; an NIC (a network interface card) 205 functioning as a network communication interface which is connected to a LAN and executes communication between the LAN and itself; a LAN port P2 (see FIG. 2A: first connecting means) which is connected to the NIC 205 and the connector (such as a connector adapted to the RJ-45 standard) of a LAN cable; a USB port I/F (interface) 206 for carrying out data communication through a USB port P1 (in FIG. 1, a port of a series B type adapted to the USB standard (see FIG. 2A)); a data transmission and reception control circuit 207 for controlling data transmission and reception to be carried by the NIC 205 and USB port I/F 206; a hardware keyport I/F (interface) 208 to be connected to a hardware key port (see FIG. 2B: second connecting means) HP connectable to a hardware key (hard key) HK functioning as a key constituting member which stores therein a device number and identification information; an identification information read circuit (identification information gain means) 209 for reading out identification information from the hardware key HK through the hardware key port I/F 208; and, an identification information judge circuit (identification information judging means) 210 for judging whether the read-out identification information is true or not.

By the way, the structure of the printer 100 shown in FIG. 1 is just an example and thus the structure of the printer 100 is not limited to this. For example, in addition to the NIC 205 and USB port I/F 206, or instead of them, there may be provided a serial I/F, a parallel I/F, an I/F for IEEE 1394, an I/F for SCSI, or the like; and, in compliance with such provision, in addition to the connecting ports P1 and P2, or instead of them, there may also be provided a port for a serial connector, a port for a parallel connector, a port for an IEEE 1394 connector, a port for an SCSI connector, or the like.

Here, in the printer 100 according to the present mode, although not limited specifically, for example, use of the network communication function by the NIC 205 is prohibited by prohibiting means which is constituted by the CPU 201. And, when the hardware key HK is connected to the hardware key connecting port HP and the identification information of the hardware key is recognized correctly by the identification information judge circuit 210, the function use permit means constituted by the CPU 201 permits use of the prohibited network communication function. Such prohibition and permission of the network communication function is just an example. That is, this is not limitative. For example, the prohibition and permission may also be the prohibition and permission of the data communication function of the USB port I/F 206, IEEE 1394 I/F, or SCSI I/F. Also, as will be discussed later, the prohibition and permission may also be the prohibition and permission of the use of a scanner device or the like which is attached to the printer 100 after the printer 100 is produced.

Next, description will be given below of an example of the structure of the hardware key HK with reference to FIG. 3.

As shown in FIG. 3, the hardware key HK includes a box body 500 which is made of, for example, resin. And, within the box body 500, there is disposed a nonvolatile memory element 501 such as a flash memory; and, in a given area of the memory element 501, there are previously stored data D1 on a device number allocated to each printer 100 (or a code peculiar to the NIC 205) and authentication code (authentication information) D2 such as an ID code. Thus, an individual hardware key HK exists in each printer 100, whereby only the user who has individually purchased the present hardware key is allowed to use the network connecting function.

As the identification information, both of the device number D1 and authentication code D2 are not essential but either of them may be used. Also, when it is desired to enhance security, the device number D1 and authentication code D2 may also be encrypted and stored.

In a given area of the ROM 202 as well, there is previously stored information (identification information) which corresponds to the above-mentioned device number D1 and authentication code D2.

Also, the memory element 501 is connected to a connecting terminal (connector) 502, while the connecting terminal 502 can be inserted into a hardware key connecting port HP formed in the printer 100. As regards the connector 502, although not limited specifically, when the hardware key connecting port HP is structured, for example, as shown in FIG. 2B, in the form of a female-type hardware key only port which includes insertion portions 600 in the upper and lower portions of its own opening, the connector 502 can be structured as a male-type connector which includes a projecting portion 502*a* to match the shape of the insertion portion 600.

Also, nowadays, with the spread of the USB standard, there is generally used a so called USB memory with a built-in flash memory; and, this UBS memory can also be used as the hardware key HK. In this case, as the connector 502 and hardware key connecting port HP, there may also be a general purpose connector and a general purpose port which are based on the USB standard.

Here, description will be given in brief of a processing procedure for a hardware key authentication processing to be executed by the identification information judge circuit 210 with reference to the flow chart shown in FIG. 4.

When the authentication processing of the hardware key is started, firstly, in Step S1, it is checked whether the hardware key HK is recognized or not (that is, whether the hardware key HK is correctly inserted into the hardware key connecting port HP or not). When it is recognized, the processing goes to Step S2. However, when it is not recognized, the processing goes to Step S3, where there is executed an error processing for displaying on the operation display panel 300 an error message such as "hardware key cannot be recognized", thereby ending the processing.

In Step S2, the identification information read circuit 209 is used to gain the device number D1 and authentication code D2 such as an ID code from the hardware key HK and, after then, the processing goes to Step S4.

In Step S4, it is checked whether the gained device number D1 and authentication code D2 are coincident with data stored in the ROM 202 or not. When it is judged that they are not coincident, the processing goes to Step S5, where there is executed an error processing for displaying an error message such as "hardware key is not coincident", thereby ending the processing.

On the other hand, in Step S4, when it is judged that the device number D1 and authentication code D2 are coincident with (or correspond to) data stored in the ROM 202, the processing goes to Step S6, where the prohibition of a prohibited function (in the present mode, the network connecting function) is removed, thereby ending the processing.

Thanks to this, only when, for example, a user who has purchased individually a normal hardware key HK inserts the hardware key HK into the hardware key connecting port HP correctly, the network connecting function can be put to its usable state.

However, in a state where the hardware key HK is correctly inserted into the hardware key connecting port HP, the prohibited function such as the network connecting function is put only to the usable state and, actually, to be able to carry out the network connecting function or the like, it is necessary to connect a given cable to a correct port.

Next, in the printer 100 according to the present mode of the invention, description will be given of embodiments of a structure for covering the LAN port P2 functioning as the first connecting means and removing such covering with reference to FIGS. 5 to 13.

Firstly, description will be given below of a first embodiment of the above-mentioned covering and removing structure with reference to FIGS. 5 and 6.

The embodiment shown in FIGS. 5 and 6 shows a structure for covering the LAN port P2 of the printer 100 using covering means (a covering member) M1 which serves as a dummy connector as well.

The covering means M1 is formed of, for example, resin such as plastics and includes a flat plate portion M1*a* for covering the LAN port P2 and a dummy connector portion M1*b*.

The flat plate portion M1*a* and hardware key portion M1*b* are connected together at right angles, while the shape of the end faces thereof shows an L shape (see FIG. 5C).

The dummy connector portion M1*b*, as shown in FIG. 2, includes elastic snap sections 503 which are formed integrally with the dummy connector portion M1*b*; and, the snap sections 503 can be respectively fitted into their associated insertion portions 600 which are formed in the upper and lower portions of the opening of the hardware key connecting port HP.

Therefore, when removing the covering means M1 which is fitted into the hardware key connecting port HP, by flexing the snap sections 503 with a finger, the engagement between the insertion portions 600 and snap sections 503 is removed to thereby put the covering means M1 to a state where it can be pulled out to the outside. Also, when fitting the covering means M1 into the hardware key connecting port HP, simply by pushing in the respective snap sections 503 into their associated insertion portions 600 of the hardware key connecting port HP, the rear end portions of the snap sections 503 can be fitted into the opening of the hardware key connecting port HP, and also upward and downward pressing forces can be applied to the covering means M1 due to the elasticity of the snap sections, whereby the covering means M1 can be held in a state where it is fitted into the hardware key connecting port HP.

In the upper and lower portions of the hardware key connecting port HP formed in the printer 100, there are formed cavity portions 601 each of which has a depth of the order of 1~2 mm, whereby the snap portion 503 can be easily held from above and below by and between the cavity portions 601.

Also, in the flat plate portion M1*a* of the covering means M1, as the need arises, there may be formed a cut-away portion, a bent portion or the like, in order that, in a state where the covering means M1 is fitted into the hardware key connecting port HP, not only it can be situated along the outer shape of the box body of the printer 100 but also it can cover the LAN port P2 formed at a given position.

In FIG. 5, a sign SW designates a power switch and a reference numeral 700 stands for the socket of a power cord.

Next, description will be given below of a hardware key HK1 with reference to FIG. 6. The parts of the hardware key HK1 having the same structures as those shown in FIG. 5 are given the same designations and the description thereof is omitted here.

The hardware key HK1 is formed of, for example, resin such as plastics and includes a built-in nonvolatile memory element such as a flash memory in which identification information and the like are stored.

Also, the hardware key HK1 further includes, in the upper and lower portions thereof, snap sections 800 similar to those formed in the covering means M1; and, by pushing in the snap sections 800 along the insertion portions 600 of the hardware key connecting port HP, the hardware key HK1 can be mounted into the printer 100.

Next, description will be given below of the operations and actions of the above-structured covering means M1 and hardware key HK1.

Firstly, as regards the normal state of the printer 100 (for example, the state thereof when it is shipped from a factory), as shown in FIG. 5A, the printer 100 is held in a state where the covering means M1 is fitted through the dummy connector portion M1*b* into the hardware key connecting port HP of the printer 100. In this state, the flat plate portion M1*a* covers the LAN port P2, whereby the LAN port P2 is visually covered from a user and the like.

On the other hand, in a case where a user or the like who wishes to connect the printer 100 to a network has purchased the hardware key HK1 individually, firstly, the user may operate the snap section 503 to thereby remove the covering means M1. As a result of this, the covering of the LAN port P2 is removed, whereby the user or the like is allowed to visually confirm the existence of the LAN port P2.

Next, the snap sections 503 of the hardware key HK1 are respectively pushed in along the insertion portions 600 of the hardware key connecting port HP into the printer 100 (see FIGS. 5D and 5E).

Thus, the hardware key authentication processing shown in the flow chart of FIG. 4 is started. When the hardware key HK1 is judged that it is a correct hardware key, the network connecting function can be put into its usable state.

And, the connector (for example, RJ-45 standard connector) of a cable C1 for LAN connection is connected to the LAN port P2 the covering of which is removed. As a result of this, through prescribed setting operations, the printer 100 can be connected to the network and thus print information or the like can be transmitted and received between the printer 100 and the network.

Next, description will be given below of a second embodiment of the above-mentioned covering and removing structure with reference to FIGS. 6 and 7.

In the second embodiment, the parts thereof having the same structures as those shown in FIGS. 5 and 6 are given the same designations and the description thereof is omitted here.

According to the second embodiment shown in FIGS. 6 and 7, there is shown a structure in which the LAN port P2 of the printer 100 is covered with a shutter type of covering means M2.

Figure 6A:
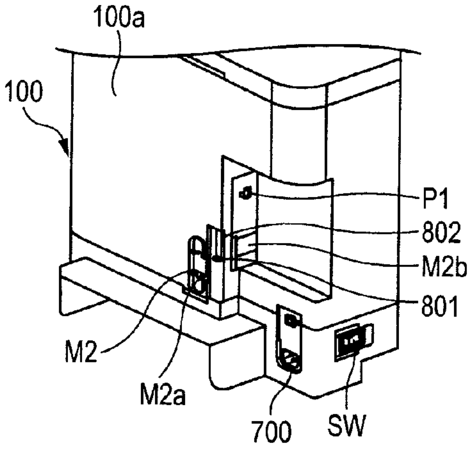
FIGS. 6A to 6D are perspective views of a second embodiment of the structure for covering the LAN port and removing the covered state thereof.

As shown in FIG. 6A, in a normal state, the LAN port P2 and hardware key connecting port HP are respectively covered with the shutter type of covering means M2.

The shutter type of covering means M2, as shown in FIG. 7, includes a covering portion M2*a* for covering the hardware key connecting port HP and a covering portion M2*b* for covering the LAN port P2.

The covering portions M2*a* and M2*b* are connected together at right angles, while the shape of their end faces provides an L-like shape.

Also, at a given position (in FIG. 7, the right end portion) of the covering portion M2*a*, there is disposed an operation lever 801.

At a given position of the box body 100*a* of the printer 100, there is formed a rectangular-shaped opening 802 in which the lever 801 of the covering means M2 can be slided in the vertical direction. Also, although not shown, at a given position of the box body 100*a*, there is formed an opening in which the covering portion M2*b* can be moved vertically with the operation of the lever 801 in a state where the covering portion M2*b* is exposed to the outside of the LAN port P2.

And, the shutter type covering means M2 is mounted on the box body 100*a* of the printer 100 in the following manner: that is, the lever 801 is exposed to the lower end side of the opening 802 of the box body 100*a* in such a manner that it can be operated; and, the hardware key connecting port HP can be covered with the covering portion M2*a*, while the LAN port P2 can be covered with the covering portion M2*b*.

By the way, the covering means M2, as shown in FIG. 7, is energized downward by a spring 803 which is disposed upwardly of the covering means M2 and also, in a normal state, it is held in a state where it covers the hardware key connecting port HP and LAN port P2.

Figure 6B:
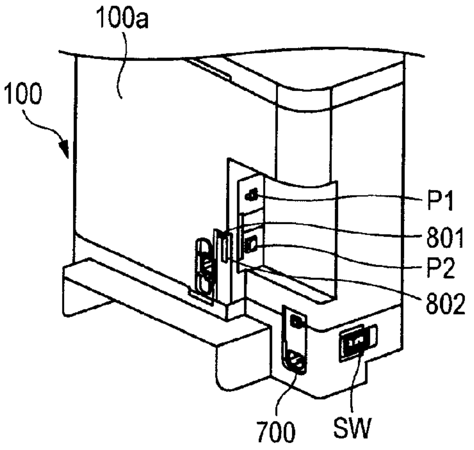
Figure 6C:
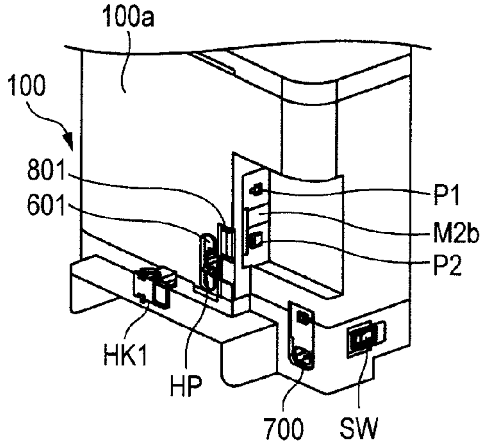
Figure 6D:
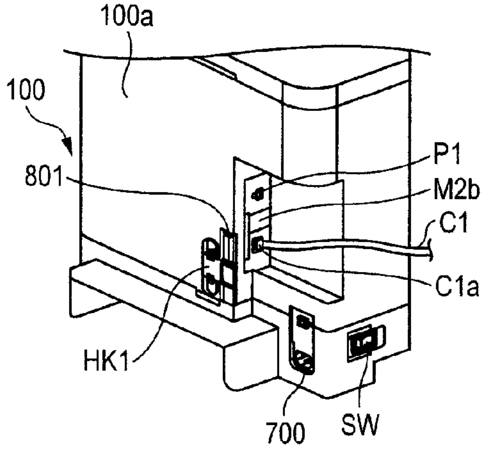

Also, the hardware key HK1 shown in FIGS. 6C and 6D is similar in structure to one employed in the before-mentioned first embodiment.

Here, description will be given below of the operation and action of the above-structured covering means M2 and hardware key HK1.

Firstly, in the normal state of the printer 100, as shown in FIG. 6A, the shutter type covering means M2 is held in such a manner that it covers the hardware key connecting port HP using the covering portion M2*a* and it covers the LAN port P2 using the covering portion M2*b*. This can prevent the occurrence of an inconvenience which can be otherwise possibly caused by the breakage of the LAN port P2 or by the short thereof when the user or the like connects the wrong cable connector to the LAN port P2.

On the other hand, when a user or the like wishing the connection of the printer 100 has purchased the hardware key HK1 individually, firstly, the user may lift the lever 801 upwardly by operating it with a finger (see FIG. 6B). As a result of this, the covered states of the hardware key connecting port HP and LAN port P2 are removed, thereby allowing the user or the like to visually confirm the existence of the hardware key connecting port HP and LAN port P2.

Next, the snap sections 503 of the hardware key HK1 are respectively pushed in along the insertion portions 600 of the hardware key connecting port HP to thereby mount the hardware key HK1 into the printer 100 (see FIGS. 6C and 6D).

Thus, the hardware key authentication processing shown in the flow chart of FIG. 4 is started. When the hardware key HK1 is judged that it is a correct hardware key, the network connecting function is put into its usable state.

And, the connector (for example, an RJ-45 standard connector) of a cable C1 for LAN connection is connected to the LAN port P2 the covering of which is removed. As a result of this, through prescribed setting operations, the printer 100 can be connected to the network and thus print information or the like can be transmitted and received between the printer 100 and the network.

Also, since the lower end portion of the covering portion M2*a* is contacted with the hardware key HK1 in a state where the hardware key HK1 is inserted into the hardware key connecting port HP, the shutter type covering means M2 is held in such a state where it is lifted upward against the energizing force of the spring 803.

Next, description will be given below of a third embodiment of the above-mentioned covering and removing structure with reference to FIGS. 8A to 10.

According to the embodiment shown in FIGS. 8A to 10, there is employed a structure in which the LAN port P2 of the printer 100 is covered with covering means M3 which is made of an inclining type of shutter.

As shown in FIGS. 8A and 8B, the covering means M3 includes a covering portion M3*a* which, in its stand-up state (a state shown in FIG. 8A) covers the LAN port P2 of the printer 100, a rotation shaft portion M3*b* to be rotatably engaged with an elongated hole shaped bearing hole 902 formed in a bearing portion 901, and an engaging portion M3*c* which is engaged with a connector portion 905 in the leading end portion of a hardware key HK2 (which will be discussed later) to incline the covering portion M3*a* (in FIG. 8B, incline the covering portion M3A to the right); and, the covering means M3 is formed of resin such as plastics in an integral body.

The hardware key HK2 is structured in the form of, for example, a card and includes projection portions 900*a* and 900*b* for guidance which are provided respectively in the lower and upper portions (in FIGS. 8A and 8B) of the hardware key HK2.

Here, description will be given below of a guide structure for guiding the hardware key HK2 with reference to FIG. 9. As shown in FIG. 9, in the printer 100, there is formed an insertion opening 150 for the hardware key HK2 and, in the lower and upper portions of the deep side of the insertion opening 150, there are formed guide grooves A1 and A2. Although not limited specifically, in the present embodiment, the guide grooves A1 and A2 respectively include not only first extension portions A1*a* and A2*a* extending a given distance in the deep direction of the insertion opening 150 but also second extension portions A1*a* and A2*b* extending in a direction perpendicular to the extending direction of the first extension portions A1*a* and A2*a*.

When the hardware key HK2 is mounted from the insertion opening 150 into the printer 100, the guiding projection portions 900*a* and 900*b* of the hardware key HK2 are respectively inserted into the guide grooves A1 and A2, and the hardware key HK2 can be manually moved along the guide grooves A1 and A2.

Also, as shown in FIGS. 8A and 8B, leftward below the bearing portion 901, there is formed a hardware key connecting port HP. And, in the leading end portion of the hardware key HK2, there is provided the connector 901 that can be connected to the hardware key connecting port HP.

Here, description will be given below of the operation and action of the above-structured covering means M3 and hardware key HK2.

Figure 10A:
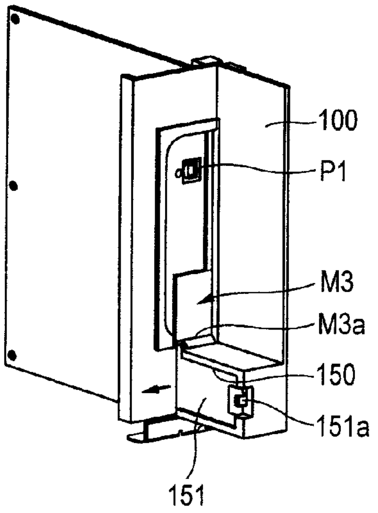
FIGS. 10A to 10D are perspective views of the third embodiment of a structure for covering the LAN port and removing the covered state thereof.
Figure 10B:
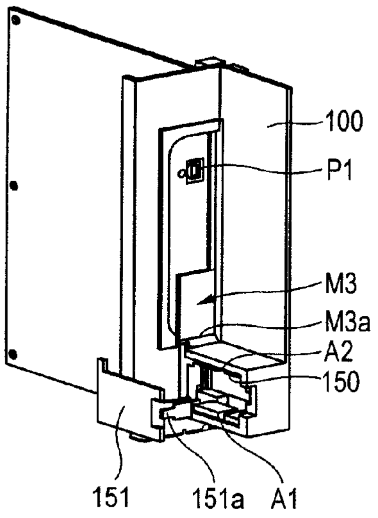

Firstly, in the normal state of the printer 100, as shown in FIG. 10A, the insertion opening 150 for the hardware key HK2 is covered with a cover member 151 (see FIG. 10A). This cover member 151 includes an elastic snap section 151*a* and, in the covered state of the insertion opening 150, the snap section 151*a* is engaged with the insertion opening 150 to thereby hold the cover member 151. Also, in this state, the covering means M3 stands up and covers the LAN port P2 with the covering portion M3*a* (see FIG. 10A). This can prevent the occurrence of an inconvenience which can be otherwise possibly caused by the breakage of the LAN port P2 or by the short thereof when the user or the like connects a cable connector to the insertion opening 150 of the hardware key HK2 or LAN port P2 by mistake.

On the other hand, when a user or the like wishing the connection of the printer 100 to a network has purchased the hardware key HK1 individually, firstly, the user may remove the cover member 151 by operating the snap section 151*a* of the cover member 151 with a finger. As a result of this, the insertion opening 150 for the hardware key HK2 is exposed to the outside (see FIG. 10B).

Figure 10C:
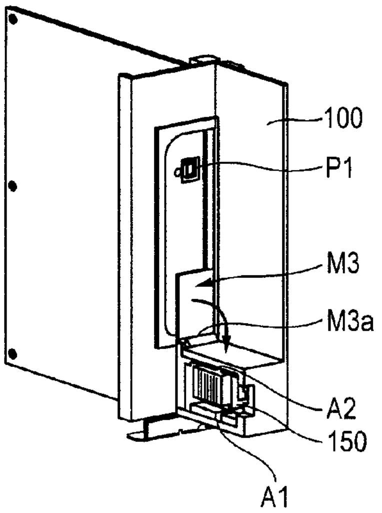

Next, the hardware key HK2 is matched in position to the insertion opening 150 and is then inserted into the insertion opening 150, and the hardware key HK2 is manually pushed in the deep direction along the first extension portions A1*a* and A2*a* of the guide grooves A1 and A2 (see FIG. 10C).

Figure 10D:
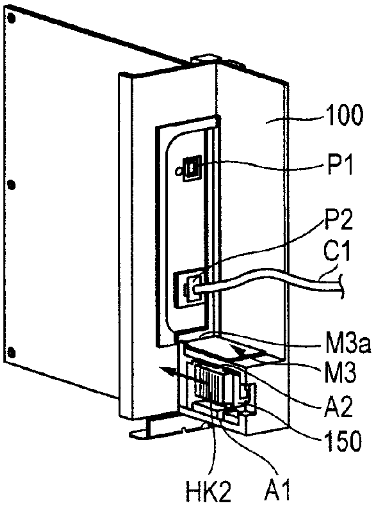

And, the hardware key HK2 is pushed along the extension portions A1*b* and A2*b* of the second guide grooves A1 and A2 into the left deep side of the insertion opening 150 in FIGS. 10A to 10D (see FIG. 10D).

In this operation, as shown in FIGS. 8A and 8B, a connector portion 905 formed in the leading end portion of the hardware key HK2 is engaged with the engaging portion M3*c* of the covering means M3, as the hardware key HK2 is moved (in FIGS. 8A and 8B, it is moved to the left), the covering means M3 is inclined to the right in FIGS. 8A and 8B with the rotation shaft portion 3*b* as the center thereof, and the connector portion 905 of the hardware key HK2 is connected to the hardware key connecting port HP, whereby the covering portion M3*a* of the covering means M3 is inclined about 90 degrees from its initial state (a state shown in FIG. 8A) to its inclined state (a state shown in FIG. 8B).

As a result of this, the covering of the LAN port P2 is removed to thereby allow the user or the like to visually confirm the existence of the hardware key connecting port HP and LAN port P2 (see FIG. 8A and FIG. 10D).

And, when the connector portion 905 of the hardware key HK2 is connected to the hardware key connecting port HP, the hardware key authentication processing according to the flow chart shown in FIG. 4 is started and, when it is judged that the hardware key HK2 is a correct hardware key, the network connecting function is put into a usable state.

Then, the connector (for example, RJ-45 standard connector) of the cable C1 for LAN connection is connected to the LAN port P2 the covered state of which has been removed. Thus, through prescribed setting operations, the printer 100 is connected to the network, whereby print information or the like can be transmitted and received between the printer 100 and network.

By the way, the covering means M3 may also include energizing means (a spring or the like) for energizing the covering member M3 in a direction to maintain the stand-up state of the covering member M3.

Next, description will be given below of a fourth embodiment of the above-mentioned covering and removing structure with reference to FIG. 11.

According to the embodiment shown in FIG. 11, there is employed a structure in which the LAN port P2 of the printer 100 is covered with covering means M4 made of a slide type shutter.

As shown in FIG. 11, in its normal state, the LAN port 2 is covered with the shutter type covering means M4.

The covering means M4 made of a slide type shutter, as shown in FIG. 11, includes a covering portion M4*a* for covering the LAN port P2, an engaging portion M4*b* to be engaged with the projection portion 160 of a hardware key HK3 (which will be discussed later), a spring 161 for energizing the covering means M4 in the opposite direction to the slide direction (the arrow mark S direction) of the covering means M4, and the like.

Also, inside the engaging portion M4*b* of the covering means M4, there is disposed a hardware key connecting port HP.

The hardware key HK3 includes the projection portion 160 which can be engaged with the engaging portion M4*b* of the covering means M4. Also, although not shown in FIG. 11, the hardware key HK3 further includes a connector portion connectable to the hardware key connecting port HP (in FIG. 11, the connector portion is formed on the surface of the hardware key HK3 that faces the hardware key connecting port HP).

Here, description will be given below of the operation and action of the above-structured covering means M4 and hardware key HK3.

Firstly, in the normal state of the printer 100, as shown in FIG. 11, the LAN port P2 is covered with the covering portion M4*a* of the covering means M4. On the other hand, when a user or the like wishing to connect the printer 100 to a network has purchased the hardware key HK3 individually, the hardware key HK3 may be matched in position to and inserted into the hardware key connecting port HP (in FIG. 11, it maybe pushed in the arrow mark T direction).

In this operation, the projection portion 160 of the hardware key HK3 is engaged with the covering portion M4*b* of the covering means M4 and, with the movement of the hardware key HK3, the covering means M4 is slided in the arrow mark S direction to thereby remove the covered state of the LAN port P2, resulting in a state where the user or the like is allowed to visually confirm the existence of the hardware key connecting port HP and LAN port P2.

And, when the connector portion 905 of the hardware key HK2 is connected to the hardware key connecting port HP, the hardware key authentication processing according to the flow chart shown in FIG. 4 is started and, when it is judged that the hardware key HK2 is a correct hardware key, the network connecting function is put into a usable state.

Next, description will be given below of a fifth embodiment of the above-mentioned covering and removing structure with reference to FIG. 12.

According to the embodiment shown in FIG. 12, there is employed a structure in which, instead of a hardware key, by mounting a scanner device 170 (which is to be attached to the printer 100 after the printer 100 is produced) onto the upper portion or the like of the printer 100, the covering of a connecting port P3 for the connector C2*a* of a connecting cable C2 provided in the scanner device 170 is removed.

Specifically, the connecting port P3 is covered with covering means M5 which is made of a shutter of a slide type.

The scanner device 170 includes a projection-shaped pressing portion 171 formed in the lower end side thereof. When the scanner device 170 is mounted onto the printer 100, the pressing portion 171 is engaged with the covering means M5 to push down the covering means M5, thereby removing the covering of the connecting port P3, which results in a state where the user or the like is allowed to visually confirm the existence of the connecting port P3.

And, when the connector C2*a* of the connecting cable C2 is connected to the connecting port P3, there is provided a state in which the scanner device 170 is put into a usable state.

Alternatively, the covering means M5 may also include energizing means which energizes the covering means M5 in the opposite direction to the depressing direction of the covering means M5.

Although description has been given heretofore in detail of the invention made by the inventors based on the specific mode and embodiments of the invention, it should be understood that the mode and embodiments disclosed in the present specification are just examples in all respects thereof and the invention is not limited to the mode and embodiments disclosed herein. That is, the technical scope of the invention should not be interpreted limitatively based on the description of the above-mentioned mode and embodiments but should be interpreted only in accordance with the scope of the appended patent claims. Also, technologies equivalent to the technology set forth in the patent claims and all modifications possible within the scope of the patent claims fall under the invention.

For example, in the present mode and embodiments, description has been given of the structures for visually covering the LAN port 2 with the covering means M1~M5. However, instead of the flat plate member, a bar member or the like for preventing the connection of the connector to the first connecting means such as the LAN port P2 may be moved into or out of the port to thereby prevent the connection of an unnecessary cable.

Also, in the above-mentioned mode and embodiments, as electronic equipment, a printer is employed. However, this is not limitative but the invention can also apply to other electronic equipment such as a personal computer, a facsimile, a copying machine or a scanner device, provided that it includes a connecting terminal (connecting port).

What is claimed is:

1. An electronic equipment comprising:

a first connecting unit that connects an external apparatus and a transmit and receive unit, which transmits and receives information;

a prohibit unit that prohibits use of a function to transmit and receive the information;

an identification information storage unit that stores therein identification information to permit use of the function prohibited by the prohibit unit;

a second connecting unit that connects a key member including a memory unit that stores therein authentication information with an electric equipment body;

a cover that, in a case where the key member is not connected to the second connecting unit, covers at least part of the first connecting unit and that, in a case where the key member is connected to the second connecting unit, removes the covering of the first connecting unit;

a gain unit that, in a case where the key member is connected to the second connecting unit, gains the authentication information from the memory unit;

a judge unit that judges whether or not the authentication information gained by the gain unit corresponds to the identification information stored in the identification information storage unit; and a permit unit that, in a case where it is judged by the judge unit that the authentication information corresponds to the identification information, permits use of the information to transmit and receive the function prohibited by the prohibit unit.

2. The electronic equipment as claimed in claim 1, wherein in a case where the key member is not connected to the second connecting unit, the cover covers at least one of parts of the first connecting unit and parts of the second connecting unit.

3. The electronic equipment as claimed in claim 1, wherein the first connecting unit comprises at least one of a connection terminal of a local area network and a data transmission line connection terminal.

4. The electronic equipment as claimed in claim 1, wherein in a case where the key member is connected to the second connecting unit, the cover is engaged with part of the key member, and is moved in a direction to remove the covering of the first connecting unit.

5. The electronic equipment as claimed in claim 1, wherein the cover comprises a guide unit that guides the key member to the second connecting unit through a given passage, and while the key member is guided and connected to the second connecting unit by the guide unit, the cover is engaged with part of the key member and is moved in a direction to remove the covering of the first connecting unit.

6. The electronic equipment as claimed in claim 1, wherein the cover comprises an energizer that, in a case where the key member is not connected to the second connecting unit, energizes the cover in a direction to cover the first connecting unit.

7. An image forming apparatus comprising:

a first connecting unit that connects an external apparatus and a transmit and receive unit, which transmits and receives information;

a prohibit unit that prohibits use of a function to transmit and receive the information;

an identification information storage unit that stores therein identification information to permit use of the function prohibited by the prohibit unit;

a second connecting unit that connects a key member including a memory unit that stores therein given authentication information;

a cover that, in a case where the key member is not connected to the second connecting unit, covers at least part of the first connecting unit and that, in a case where the key member is connected to the second connecting unit, removes the covering of the first connecting unit;

a gain unit that, in a case where the key member is connected to the second connecting unit, gains the authentication information from the memory unit;

a judge unit that judges whether or not the authentication information gained by the gain unit corresponds to the identification information stored in the identification information storage unit; and a permit unit that, in a case where it is judged by the judge unit that the authentication information corresponds to the identification information, permits use of the information to transmit and receive the function prohibited by the prohibit unit.

8. The image forming apparatus as claimed in claim 7, wherein in a case where the key member is not connected to the second connecting unit, the cover covers at least one of parts of the first connecting unit and parts of the second connecting unit.

9. The image forming apparatus as claimed in claim 7, wherein the first connecting unit comprises at least one of a connection terminal of a local area network and a data transmission line connection terminal.

10. The image forming apparatus as claimed in claim 7, wherein in a case where the key member is connected to the second connecting unit, the cover is engaged with part of the key member, and is moved in a direction to remove the covering of the first connecting unit.

11. The image forming apparatus as claimed in claim 7, wherein the cover comprises a guide unit that guides the key member to the second connecting unit through a given passage, and while the key member is guided and connected to the second connecting unit by the guide unit, the cover is engaged with part of the key member and is moved in a direction to remove the covering of the first connecting unit.

12. The image forming apparatus as claimed in claim 7, wherein the cover comprises an energizer that, in a case where the key member is not connected to the second connecting unit, energizes the cover in a direction to cover the first connecting unit.

* * * * *